No. 842,441. PATENTED JAN. 29, 1907.
H. ANDERSON.
COMPOUND STEAM ENGINE.
APPLICATION FILED APR. 9, 1906.
5 SHEETS—SHEET 1.
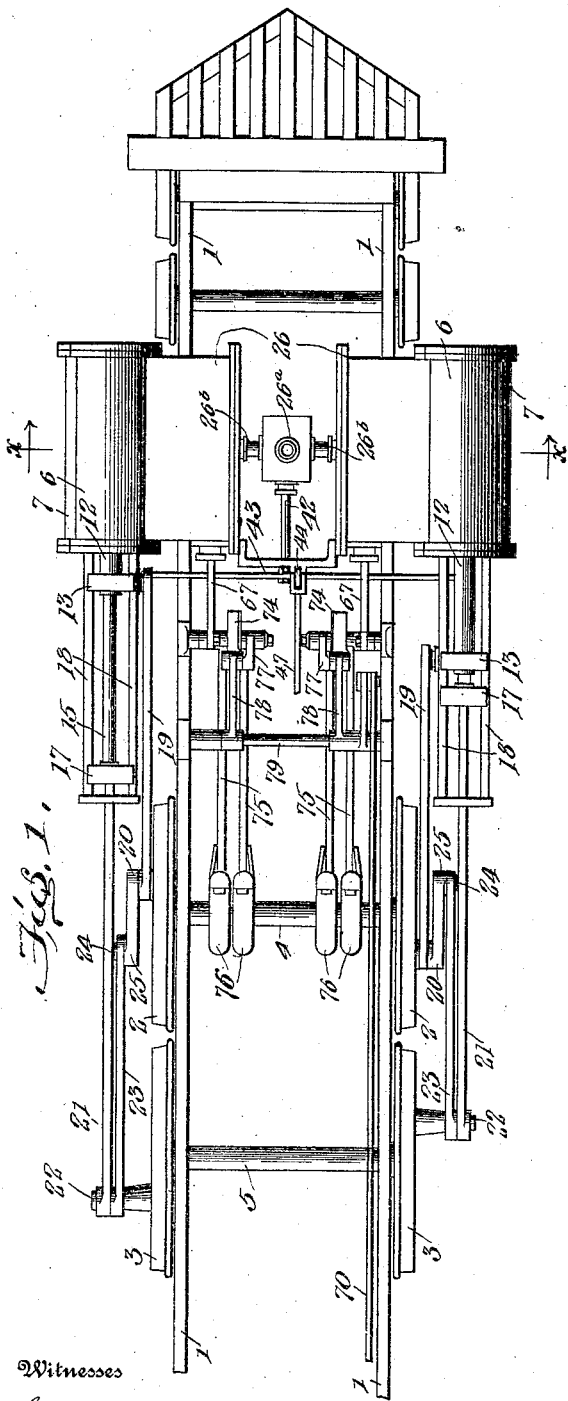
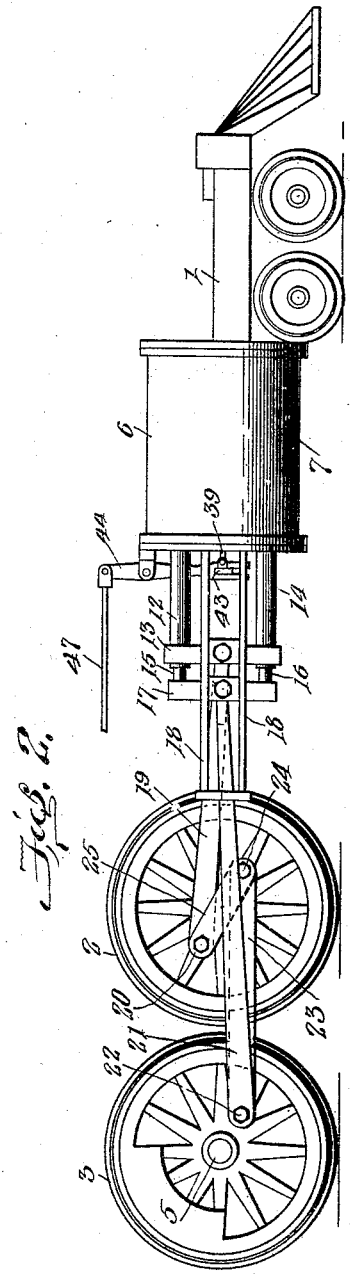
Witnesses
G. Howard Walmsley.
Irvine Miller.
Inventor
Harry Anderson,
By H. A. Goulding,
Attorney No. 842,441. PATENTED JAN. 29, 1907.
H. ANDERSON.
COMPOUND STEAM ENGINE.
APPLICATION FILED APR. 9, 1906.
5 SHEETS—SHEET 2.
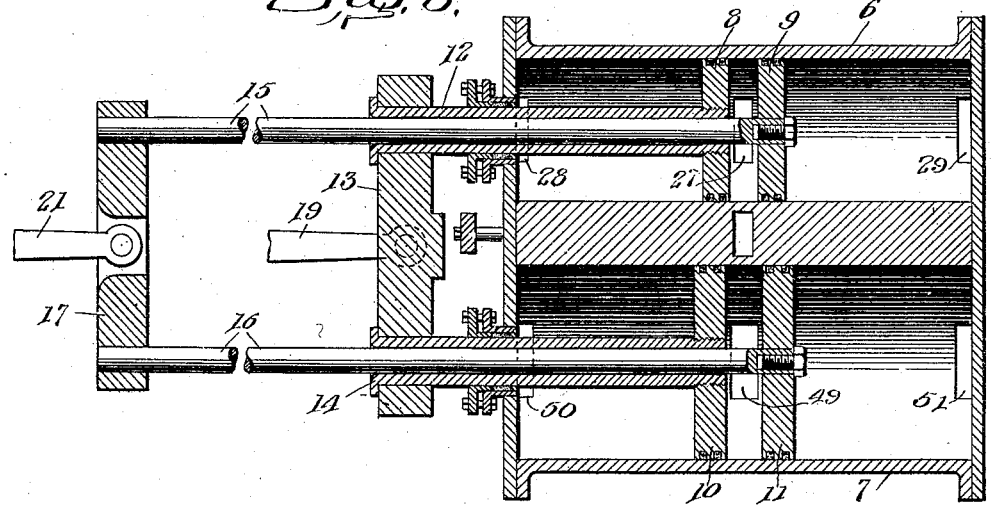
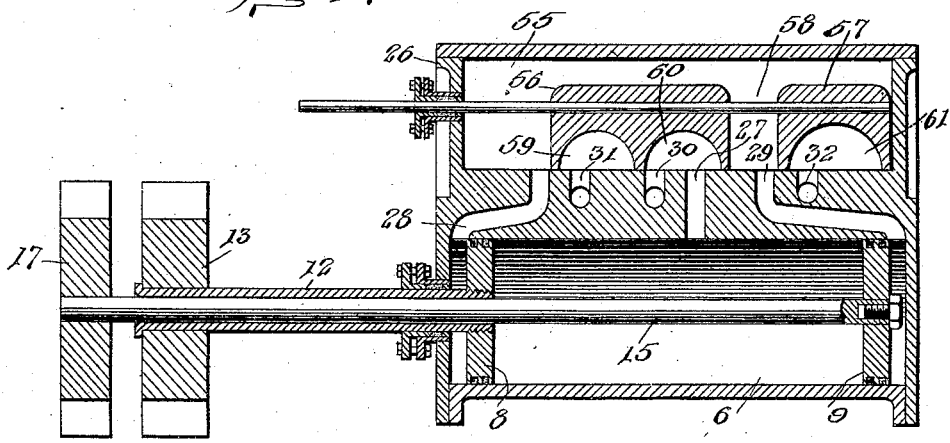

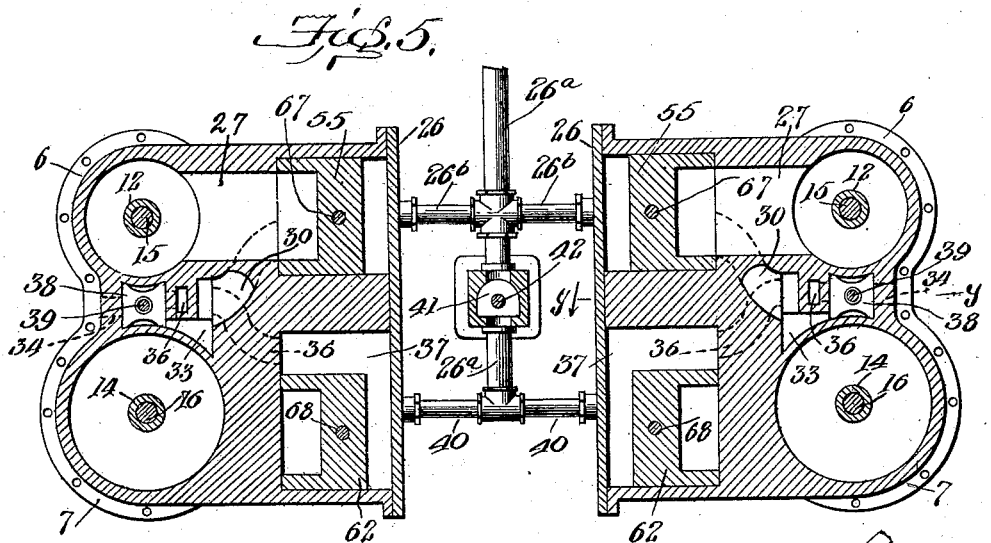

No. 842,441. PATENTED JAN. 29, 1907.
H. ANDERSON.
COMPOUND STEAM ENGINE.
APPLICATION FILED APR. 9, 1906.
5 SHEETS—SHEET 4.
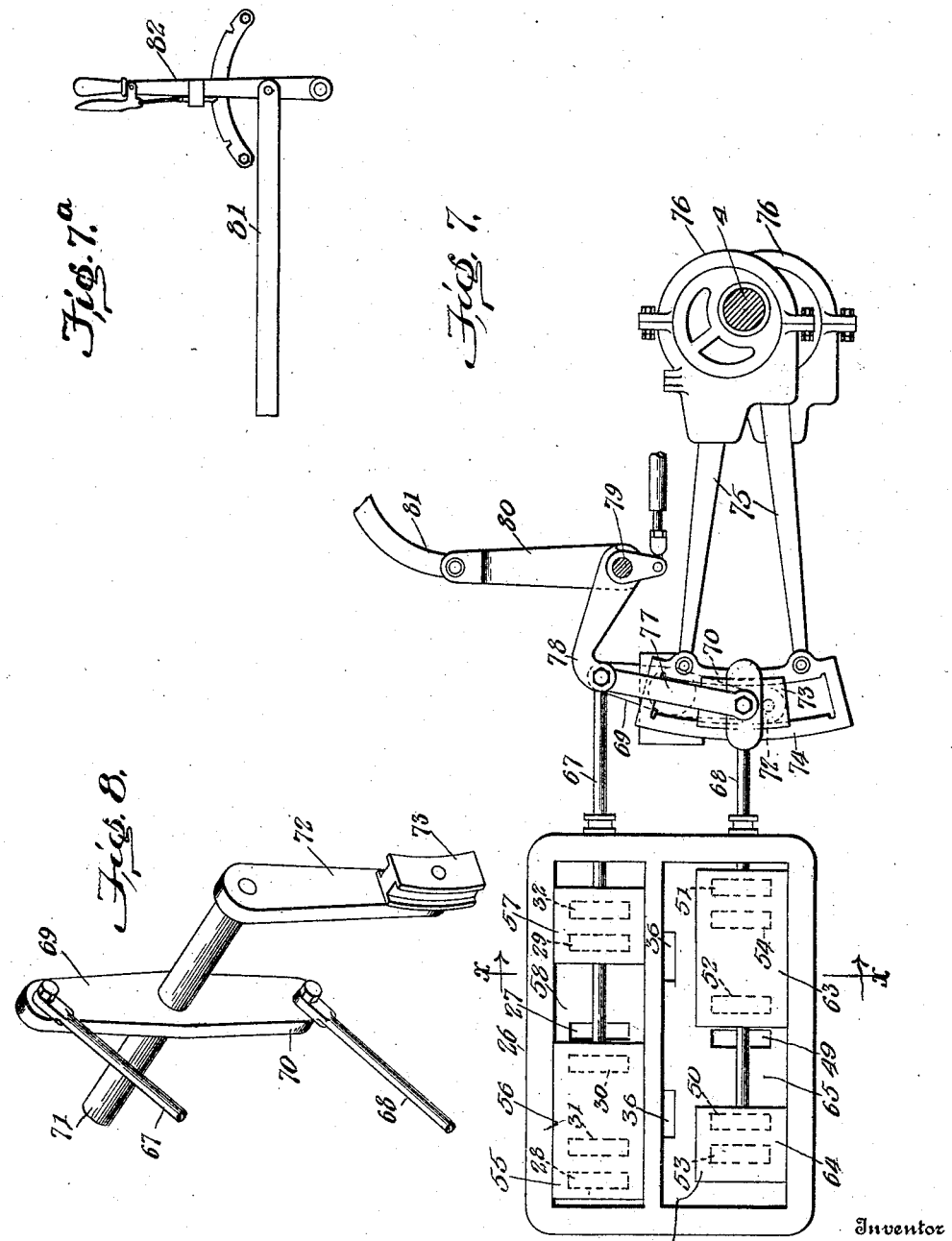

No. 842,441. PATENTED JAN. 29, 1907.
H. ANDERSON.
COMPOUND STEAM ENGINE.
APPLICATION FILED APR. 9, 1906.

5 SHEETS—SHEET 5.

Inventor
Harry Anderson,

Witnesses
G. Howard Walmsley,
Irvine Miller.

By H. A. Toulmin.
Attorney

UNITED STATES PATENT OFFICE.

HARRY ANDERSON, OF SPRINGFIELD, OHIO.

COMPOUND STEAM-ENGINE.

No. 842,441.     Specification of Letters Patent.     Patented Jan. 29, 1907.

Application filed April 9, 1906. Serial No. 310,600.

*To all whom it may concern:*

Be it known that I, HARRY ANDERSON, a citizen of the United States, residing at Springfield, in the county of Clark and State of Ohio, have invented certain new and useful Improvements in Compound Steam-Engines, of which the following is a specification, reference being had therein to the accompanying drawings.

This invention relates to compound steam-engines, being more particularly adapted to locomotive-engines, and has for its object to provide a compact structure the parts whereof are balanced to avoid vibration and organized to develop ample power and supply the same in an efficient manner, as required.

To these and other ends my invention consists in certain novel features, which I will now proceed to describe and will then particularly point out in the claims.

Figure 9:
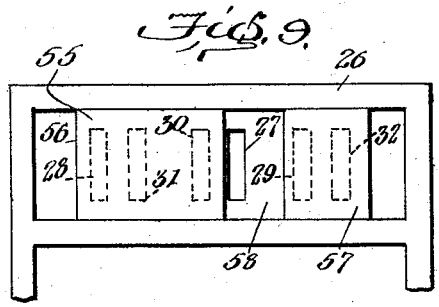
Figure 11:
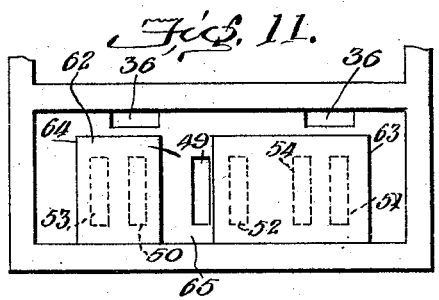
Figure 10:
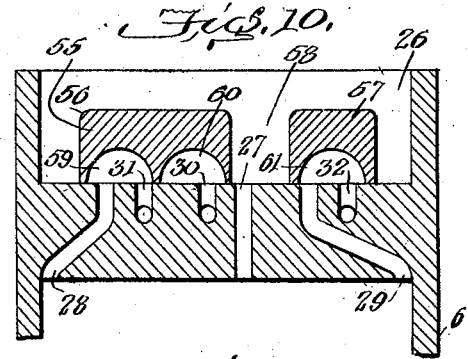
Figure 12:
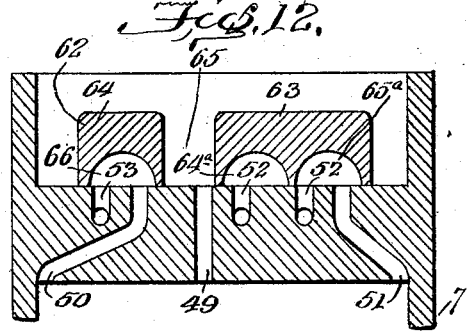
Figure 13:
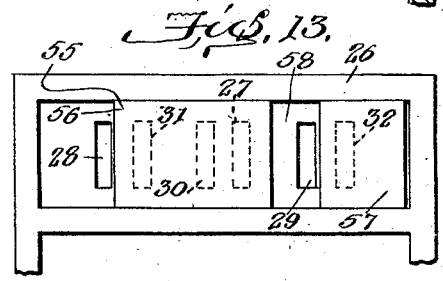
Figure 15:
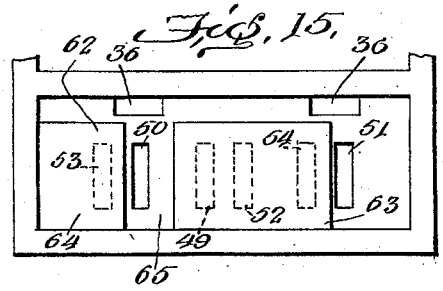
Figure 14:
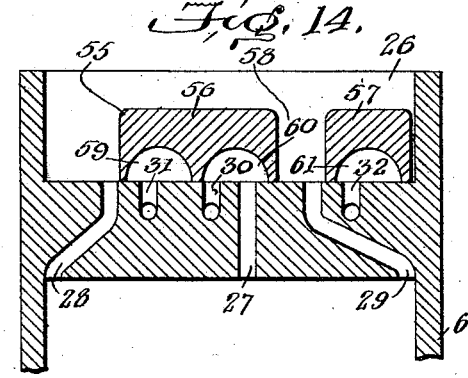
Figure 16:
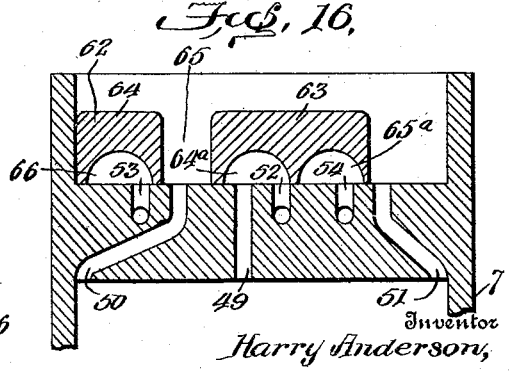

In the accompanying drawings, Figure 1 is a plan view of so much of a locomotive as is necessary to an understanding of my invention. Fig. 2 is a side elevation of the same. Fig. 3 is a vertical sectional view taken longitudinally through one pair of the cylinders. Fig. 4 is a horizontal sectional view through one of the high-pressure cylinders and its valve-chest. Fig. 5 is a transverse sectional view taken on the line $x\,x$ of Fig. 1 and looking in the direction of the arrows. Fig. 6 is a detail sectional view taken on the line $y\,y$ of Fig. 5 and looking in the direction of the arrows. Fig. 6$^a$ is a detail view of the valve members and the operating mechanism therefor. Fig. 7 is a side elevation of the valves and valve-gear detached. Fig. 7$^a$ is a detail view of the controlling means for the valve link mechanism. Fig. 8 is a detail perspective view of one end of the rock-shaft and its connections. Figs. 9 and 10 are respectively an elevation and horizontal section through one of the high-pressure valve-chests, showing one position of the valve therein. Figs. 11 and 12 are similar views of the low-pressure valve and valve-chest, showing the position of those parts corresponding to what is shown in Figs. 9 and 10. Figs. 13 and 14 are views similar to Figs. 9 and 10, showing the other position of the high-pressure valve; and Figs. 15 and 16 are similar views showing the corresponding position of the low-pressure valve.

In describing the particular embodiment of my invention chosen for purposes of illustration I shall describe only one of the two engines of which the structure is composed, it being understood that, as usual, the engines on the two sides of the locomotive are similar, although reversely arranged, so that a description of one of them will suffice for both. Said engines are mounted on the usual frame 1, which is supported on two pairs of driving-wheels 2 and 3, mounted on the usual axles 4 and 5. Each engine comprises two cylinders 6 and 7, the former being a high-pressure cylinder, receiving steam directly from the boiler, while the latter is a low-pressure cylinder, receiving steam from the adjacent high-pressure cylinder in the manner hereinafter described. These cylinders are supported on the outside of the frame 1 in the usual position, with their axes arranged horizontally, the high-pressure cylinder being located immediately above the low-pressure cylinder. Said cylinders are each of about twice the usual length and are each provided with two pistons, the cylinder 6 having pistons 8 and 9 and the cylinder 7 having pistons 10 and 11, the latter being, as is usual in compound engines, of greater diameter than the former. The piston 8 has a hollow piston-rod 12, extending through the rear cylinder-head and connected to a cross-head 13, the piston 10 having a similar hollow piston-rod 14, extending through the rear head of its cylinder and also connected to the cross-head 13. The pistons 9 and 11 are respectively provided with rods 15 and 16, which extend rearward through the hollow piston-rods 12 and 14 and are connected at their rear ends to a second cross-head 17, located rearward with respect to the cross-head 13. The cross-heads are supported and guided on the usual guide-bars 18. Each cross-head 13 has pivoted to it the forward end of a connecting-rod 19, the rear end of which is pivoted to a crank-pin 20 on the corresponding front driving-wheel 2. Each cross-head 17 has pivoted to it the front end of a connecting-rod 21, the rear end of which is pivoted to a crank-pin 22 on the corresponding rear driving-wheel 3. It will be observed that the crank-pins 20 and 22 are set in diametrically opposite positions, owing to the fact that the pistons to which they are respectively connected travel in opposite directions, as hereinafter set forth. The driving-wheels are coupled in pairs on each side by a coupling-bar 23, the rear end of which is mounted on the crank-pin 22, while the front end thereof is mounted on a crank-pin 24, carried by an arm 25, supported by the crank-pin 20. The arm 25 extends diametrically across the wheel 2, the crank-pin 20 being located at one end thereof and the crank-pin 24 being located at the other end thereof, so that said crank-pins are in diametrically opposite position.

Each cylinder has a valve-chest, the valve-chests being located inward from the corresponding cylinders, and, like said cylinders, they are arranged the one above the other. The valve-chest for the high-pressure cylinder is indicated by the reference-numeral 26 and receives steam from the boiler through a supply-pipe 26$^a$ and branch pipe 26$^b$. It is provided with a central steam-port 27, leading to the center of the corresponding cylinder 6. Ports 28 and 29 lead from the valve-chest to the respective ends of the cylinder 6. Each of the three ports 27, 28, and 29 has adjacent to it an exhaust-port, said exhaust-port being respectively indicated by the numerals 30, 31, and 32. These exhaust-ports extend to a starting-valve chamber 33, into which they discharge freely, said chamber being located between the cylinders 6 and 7. An exhaust-port 34 is located on the outside of this starting-valve chamber, and in the opposite side of said chamber there is provided a port 35, which by means of passage 36 leads to the low-pressure valve-chest 37. A valve 38 fits and slides between the opposing surfaces of the valve-chamber 33, in which the ports 34 and 35 are formed, its construction being such that in one of its positions it closes the port 35, leaving the port 34 open, while in the other of its positions it closes the port 34, leaving the port 35 open. The valve 38 is provided with an operating-stem 39, by means of which it is operated. The supply-pipe 26$^a$ is extended beyond the point where the branches 26$^b$ lead to the high-pressure valve-chests, and this extension is connected with the low-pressure valve-chests by means of branch pipes 40. In said extension there is located a valve 41, so constructed as to either close the supply-pipe to prevent the passage of steam therethrough or open the same, so as to permit free passage of steam directly from the boiler to the low-pressure valve-chests. This valve has a stem 42, by means of which it is operated, and the said valve-stem 42 is connected with the valve-stems 39 of the valves 38 by means of a cross-piece 43, so that all of said valves and their stems move in unison. A lever 44 is connected to the cross-piece 43 to operate the same, said lever being connected by a rod 47 to a lever 48 in the cab, by means of which the three valves may be controlled by the engineer. When the engine is starting, steam is admitted directly from the boiler at high pressure to both valve-chests, the valve 41 being so moved as to permit the steam to pass directly to the low-pressure valve-chests, while the valves 38 are so moved as to close the ports 35 and open the ports 34, allowing the steam from the high-pressure cylinders to exhaust directly through the valve-chambers 33 and ports 34. When the engine is running compound, the valve 41 is so moved as to cut off the live steam from the high-pressure valve-chests, the valves 38 being at the same time so moved as to close the ports 34 and open the ports 35, in which position of the parts the exhaust-steam from the high-pressure cylinders after entering the valve-chambers 33 through the ports 30 escapes therefrom through the ports 35 and passages 36 to the low-pressure valve-chests.

Each low-pressure valve-chest has a central steam-port 49, leading directly to the center of the low-pressure cylinder 7, and steam-ports 50 and 51, leading to the respective ends of said cylinder. An exhaust-port 52 is located adjacent to the port 49, an exhaust-port 53 adjacent to the port 50, and an exhaust-port 54 adjacent to the port 51. These three exhaust-ports are connected in any suitable way with the exhaust-nozzle.

The high-pressure valve (indicated as a whole by the reference-numeral 55) comprises two members 56 and 57, separated by a space or opening 58, which forms a port through which steam may have access to the port 27. The member 56 has in its inner face a port or cavity 59, by means of which the ports 28 and 31 may be brought into communication, and a port or cavity 60, by means of which the ports 27 and 30 may be brought into communication. The member 57 has in its under face a cavity 61, by means of which the ports 29 and 32 may be brought into communication.

The low-pressure valve (indicated as a whole by the reference-numeral 62) comprises two members 63 and 64, with a space or opening 65 between them forming a passage by which the steam in the chest may have access to the port 49. The valve member 63 has in its under face a port or cavity 64$^a$, by means of which the ports 49 and 52 may be brought into communication, and a second port or cavity 65$^a$, by means of which the ports 51 and 54 may be brought into communication. The valve member 64 has in its under face a port or cavity 66, by means of which the ports 50 and 53 may be brought into communication. The valves 55 and 62 move in opposite directions, and to effect this movement their respective stems 67 and 68 are connected to crank-arms 69 and 70, extending in diametrically opposite directions from the rock-shaft 71. The movements of this rock-shaft are controlled by the usual link-motion, the rock-shaft having at its end an arm 72, on which the link-block 73 is pivoted. The link 74 is mounted on said link-block and actuated by the eccentric-rods 75 from eccentrics 76 on the front axle 4. The link is shifted by the usual suspension-link 77, supported from an arm 78 on the tumbling-shaft 79, said shaft having the usual arm 80, connected by the reach-rod 81 to the reversing-lever 82.

It will be seen that the foregoing mechanism will move the valves 55 and 62 in opposite directions at the desired time and to the desired extent. When the valve 55 is in the position shown in Figs. 9 and 10, steam from the boiler passes through the ports 58 and 27 into the central part of the cylinder 6 between the pistons 8 and 9 therein, causing said pistons to move outward away from each other and toward the ends of the cylinder. At this time the valve 62 is in the position shown in Figs. 11 and 12, and the exhaust-steam from the ends of the cylinder 6 passes through ports 28, 59, and 31 at one end and ports 29, 61, and 32 at the other end, entering into the steam-chest 33 and passing down through the ports 65 and 49 between the pistons 10 and 11 in the low-pressure cylinder, causing these pistons to move outward or away from each other in unison with the pistons 8 and 9. This movement causes the cross-head 13 to move forward and the cross-head 17 to move rearward, each cross-head through its connecting-rod imparting a forward motion to the driving-wheel to which it is connected. When the pistons have reached the end of their stroke, the valves assume the positions shown in Figs. 13 and 16. In the high-pressure valve-chest the ports 28 and 29 are in communication with the live steam, the latter through the port 58, and steam is admitted to the ends of the cylinder 6, moving the pistons 8 and 9 toward each other. The steam between the pistons exhausts through the ports 27, 60, and 30 into the low-pressure valve-chest, where it has access to the ends of the cylinder 7 through the ports 50 and 51, reaching the former through the port 65. At the same time the steam between the pistons 10 and 11, which are now approaching each other, exhausts through the ports 49, 64, and 52 to the exhaust-nozzle.

It will be observed that the location and arrangement of the parts is such that they can be readily applied to locomotives of the dimensions now in use without increasing their width or height beyond the prescribed maximum and without necessitating any additional parts inside of the frame. Both pistons and valves move in opposite directions in such a way as to counterbalance each other and reduce the shock and vibration to a minimum. Each driving-wheel has two pistons connected to it, the front pistons of the two engines imparting movement to the driving-wheels 2 on the front axle 4, while the rear pistons of the two engines impart rotatory movement to the driving-wheels 3 on the rear axle 5. Thus ample power is provided to propel the locomotive, and the steam is used expansively and economically. The valve motion is such that the direction and point of cut-off of the valves are all readily regulated from a single lever without increasing the number of eccentrics employed.

I do not wish to be understood as limiting myself to the precise details of construction hereinbefore described, and shown in the accompanying drawings, as it is obvious that these details may be modified without departing from the principle of my invention. For instance, the coupling connection between the two axles, whereby uniformity of rotation is obtained, may be other than that shown.

Having thus fully described my invention, what I claim as new, and desire to secure by Letters Patent, is—

1. In a locomotive, the combination, with two axles provided with driving-wheels, of two engines, each comprising a high-pressure cylinder and a low-pressure cylinder, each cylinder provided with two pistons and with means for alternately admitting steam between said pistons and at the ends of the cylinders, cross-heads to which the rear pistons of each engine are connected, other cross-heads to which the front pistons are connected, said cross-heads being located one beyond the other at the same end of the cylinders, rods connecting the first-mentioned cross-heads with the crank-pins of the front driving-wheels, and other rods connecting the last-mentioned cross-heads with the crank-pins of the rear driving-wheels, substantially as described.

2. In a locomotive, the combination, with two axles provided with driving-wheels, of two engines, each comprising a high-pressure cylinder and a low-pressure cylinder, each cylinder provided with two pistons and with means for alternately admitting steam between said pistons and at the ends of the cylinders, cross-heads to which the rear pistons of each engine are connected, other cross-heads to which the front pistons are connected, said cross-heads being arranged at one end of said cylinders in substantially the same horizontal plane, a common guideway for said cross-heads, rods connecting the first-mentioned cross-heads with the crank-pins of the front driving-wheels, other rods connecting the last-mentioned cross-heads with the crank-pins of the rear driving-wheels, and means connecting said front and rear driving-wheels to cause them to rotate in unison, substantially as described.

3. In a locomotive, the combination, with two axles provided with driving-wheels, of two engines, each comprising a high-pressure cylinder and a low-pressure cylinder, each cylinder provided with two pistons and with means for alternately admitting steam between said pistons and at the ends of the cylinders, cross-heads to which the rear pistons of each engine are connected, other cross-heads to which the front pistons are connected, rods connecting the first-mentioned cross-heads with the crank-pins of the front driving-wheels, other rods connecting the last-mentioned cross-heads with the crank-pins of the rear driving-wheels, and means connecting said front and rear driving-wheels to cause them to rotate in unison, said means comprising an arm secured to the crank-pin of one of said driving-wheels, said arm extending across the wheel center and having a crank-pin on its farther end and a coupling-rod connecting said last-mentioned crank-pin to the crank-pin of the other driving-wheel, substantially as described.

In testimony whereof I affix my signature in presence of two witnesses.

HARRY ANDERSON.

Witnesses:
HARRIET L. HAMMAKER,
G. H. WALMSLEY.